United States Patent

Gerber

[15] 3,686,981
[45] Aug. 29, 1972

[54] SAW FILING APPARATUS

[72] Inventor: Christian N. Gerber, 1428 Cheswick Place, Westlake Village, Calif. 91361

[22] Filed: May 5, 1971

[21] Appl. No.: 140,494

[52] U.S. Cl. .................................................. 76/36
[51] Int. Cl. .............................................. B23d 63/08
[58] Field of Search ...................... 76/36; 29/80, 78

[56] References Cited

UNITED STATES PATENTS

| 1,753,701 | 4/1930 | Grant | 76/36 |
| 1,598,020 | 8/1926 | Skowron | 76/36 UX |
| 2,543,192 | 2/1951 | Nelson | 76/36 |

FOREIGN PATENTS OR APPLICATIONS

| 138,451 | 6/1947 | Australia | 76/36 |

Primary Examiner—Bernard Stickney
Attorney—William H. Maxwell

[57] ABSTRACT

Apparatus for guiding and controlling manual sharpening of saw teeth and comprised of a guide block to which a file is mounted for correct rotative positioning and of a surface plate clamp in which the saw to be sharpened is held with the teeth thereof exposed; said grip block being depressable so as to control limited cutting of the file into the saw teeth upon the application of downward pressure while forcibly moving the file forwardly along guides in the surface plate clamp; and said file being reversibly mounted to said guide block for cutting teeth set out at opposite sides of the saw.

10 Claims, 9 Drawing Figures

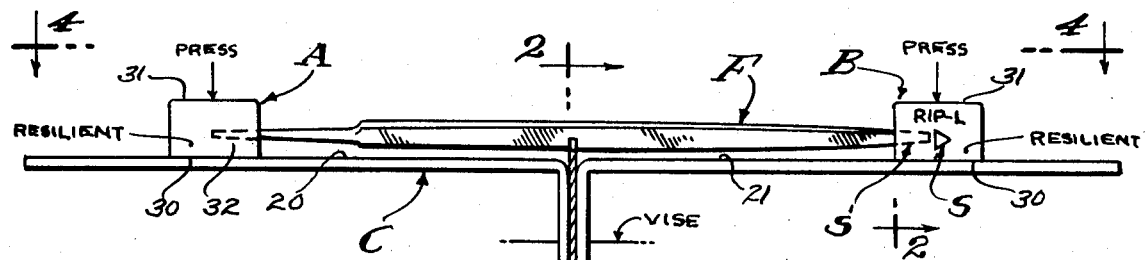
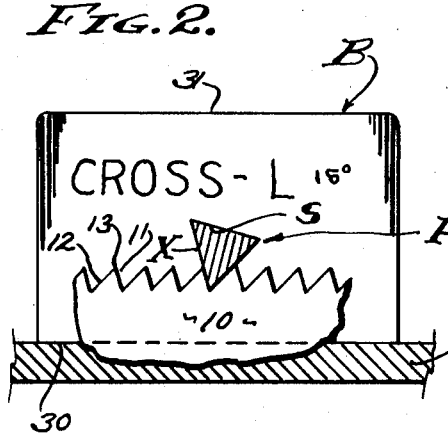
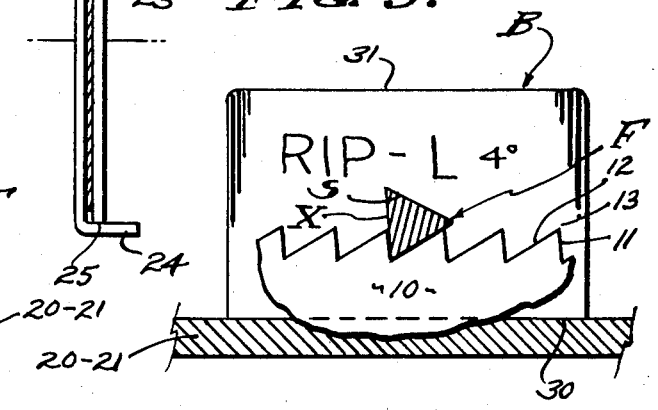
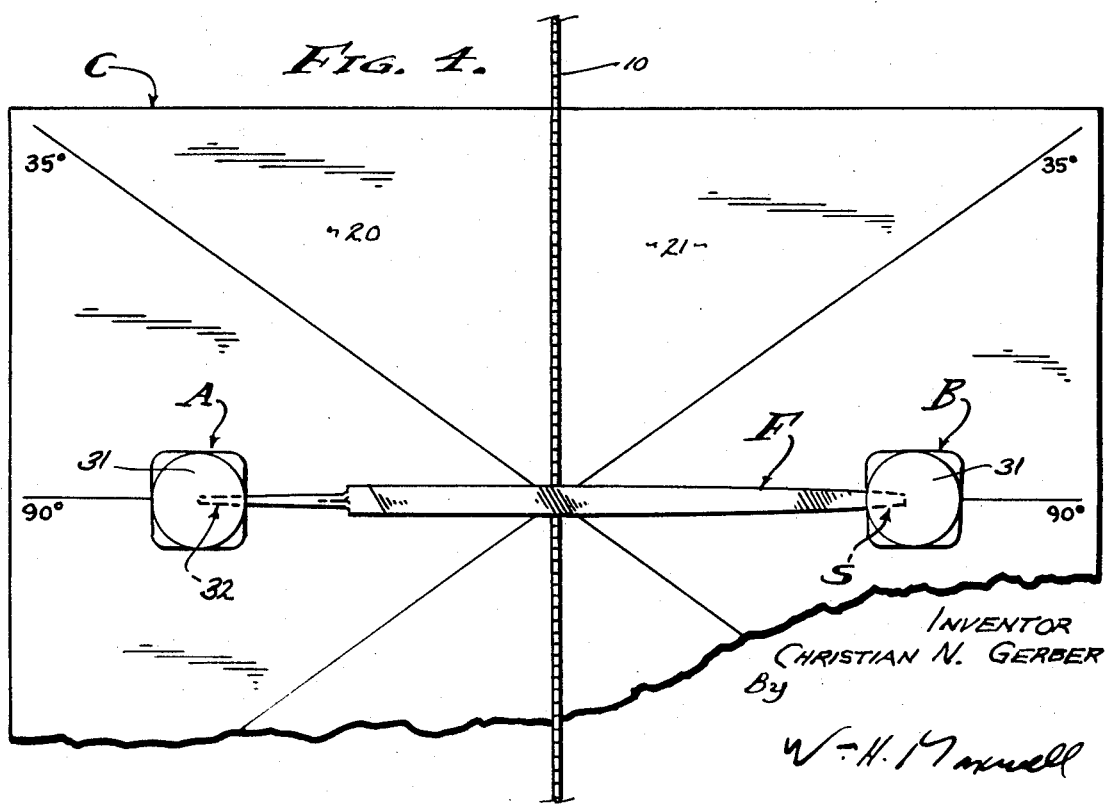

Patented Aug. 29, 1972
3,686,981
2 Sheets-Sheet 2
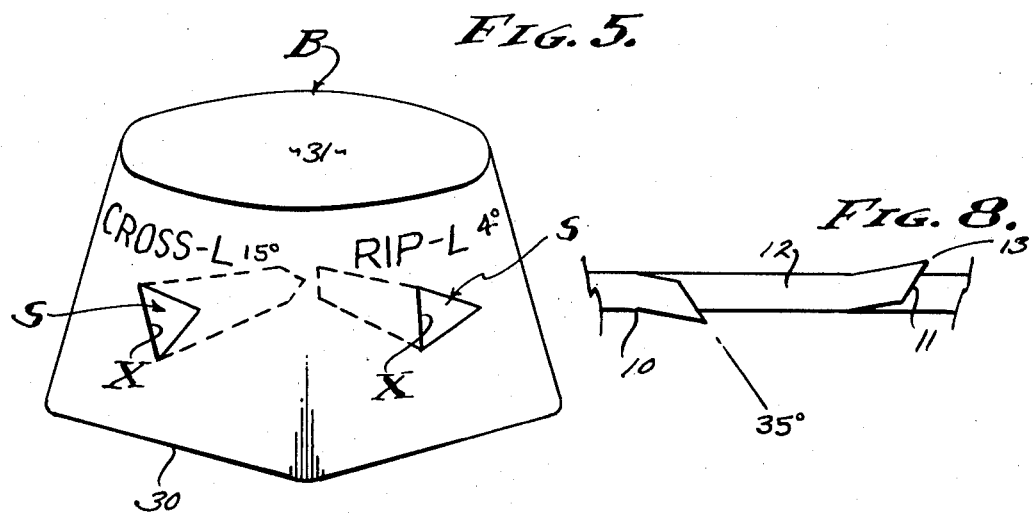
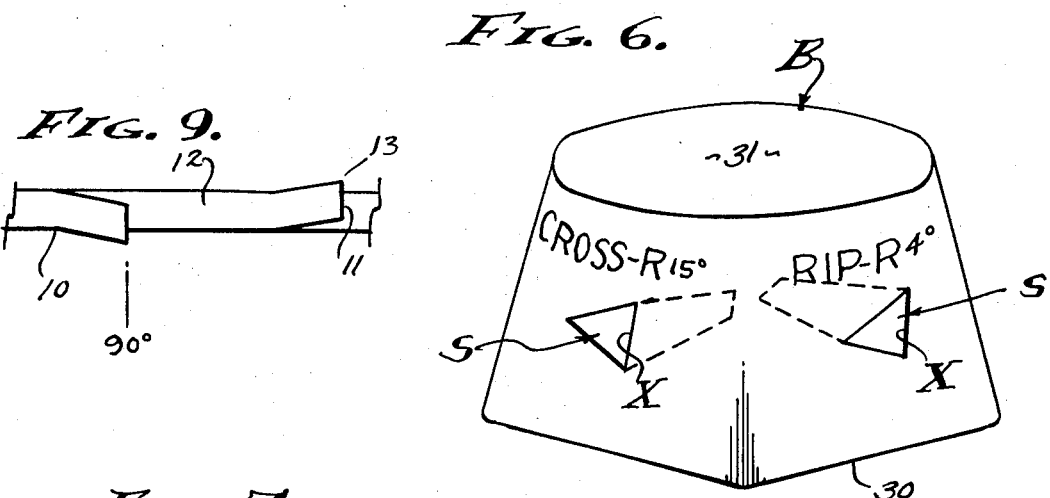
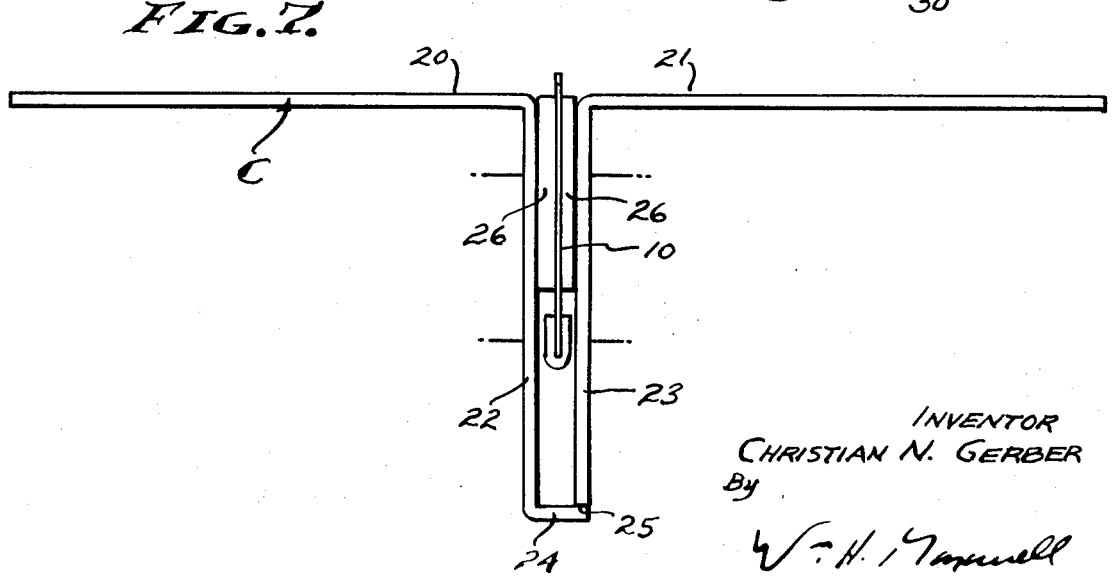
INVENTOR
CHRISTIAN N. GERBER
By
W. H. Maxwell

SAW FILING APPARATUS

BACKGROUND

The sharpening of saw teeth is an exacting art which requires knowledgeability and invariable dexterity in the handling of files that are specially provided for the purpose. That is, the person must know at what rake and shear angles to hole the file while maintaining these two angles throughout the multiplicity of saw teeth being sharpened. Saw sharpening files are provided for this purpose, tapered files having an equi-lateral triangular cross section. Thus, the angular displacement between two sides of the file is 60°, this being the normal included angle for the root opening of each tooth and the point as well. Also, saw sharpening files are characterized by a parallel body section extending half the length and by a tapered body section continuing to the tip. A tapered tang extends from the parallel body section, normally to receive a handle. It is this file which is used to sharpen a carpenter's cross-cut and/or rip saw, but due to the aforementioned requirements there are very few persons with the ability to properly sharpen a saw; and it is to these ends that I have provided the apparatus of the present invention wherein both knowledge and physical ability are replaced by means controlling the same.

FIELD OF INVENTION

It is an object of this invention to provide means for guiding and controlling the manual sharpening of saw teeth. With the present invention the saw teeth are sharpened with the usual file controllably guided by a grip block engageable upon a surface plate clamp.

It is another object of this invention to provide saw sharpening control means which is reversible to sharpen both the right and left set teeth. With the present invention the guide block is reversed and which automatically revolves the file to a correct rake angle.

It is still another object of this invention to provide saw sharpening control means which is adjustable to the tooth angle required of various saws such as, for example, cross-cut and/or rip saws. With the present invention the guide block is multi-faced and each face is socketed for the reception of the tip portion of the file, the sockets being characteristically of equi-lateral triangular cross section.

It is also an object of this invention to provide a saw sharpening apparatus of the character referred to wherein the guide block to which the file is mounted is a depressible element, whereby the file is engageable into pressured engagement with and to remove metal from the teeth in order to sharpen the same.

It is a further object of this invention to provide a surface plate clamp for securing a saw blade with its teeth exposed, and to provide guides for directing the cutting movement of the file. With the present invention the saw blade is held firmly without vibrating and the guides assure the correct shear angle position to be followed in manipulating the file.

It is still a further object of this invention to provide a saw filing apparatus of the character thus far referred to which involves preliminary support for the file, preferably a pair of said guide blocks, and which is advantageously employed to adjust the tooth projection of the saw, and to provide for controlled limited depression of the file when forced to move so as to have a vibration damped cutting action in sharpening each tooth.

DRAWINGS

The various objects and features of this invention will be fully understood from the following detailed description of the typical preferred form and application thereof, throughout which description reference is made to the accompanying drawings, in which:

FIG. 1 is a sectional view through a handsaw blade showing the apparatus of the present invention in elevation.

FIG. 2 is an enlarged sectional view taken substantially as indicated by line 2—2 on FIG. 1.

FIG. 3 is a view similar to FIG. 2 showing the right hand end of the guide block as it is shown in FIG. 2.

FIG. 4 is a plan view taken as indicated by line 4—4 on FIG. 1.

FIGS. 5 and 6 are perspective views of the guide block, FIG. 5 showing the two sides thereof marked cross-L 15° and rip-L 4°, FIG. 6 showing the two sides thereof marked cross-R 15° and rip-R 4°.

FIG. 7 is a view similar to FIG. 1 illustrating the spacers that are provided to accommodate saws such as miter saws, and, FIGS. 8 and 9 are detailed views showing the shear angles of cross cut and rip saws respectively.

PREFERRED EMBODIMENT

Saws which are most commonly used can be classified as either cross-cut or rip saws, although other types and/or special saws can be involved. However, the present invention has its appeal and practical utility in the sharpening of common carpenter's saws, and especially to enable the less knowledgeable person to sharpen his saws. With this purpose in mind, it is the normal sized cross-cut and rip saws which are most widely used and which require continued sharpening, and which are characterized by a flat blade 10 of spring steel having a margin from which a continuous series of teeth are oppositely set. The teeth are alike in both types of saws under consideration, having a front face 11 disposed at specified rake and shear angles, and having a back face 12 slanting away from the front face to form a root opening exposing the next following tooth point 13. Also, the successive teeth are set out, or bent, to project from opposite sides of the blade, thereby exposing the points 13 of the teeth to cut wider than the blade thickness. In the drawings I have shown a typical cross-cut tooth configuration in FIG. 2 and a typical rip tooth configuration in FIG. 3; and in both instances the tooth form of the blade 10 involves a front face 11 and a back face 12, said two faces converging at a cutting point 13. The cross-cut tooth of FIG. 2 is shown as having a typical rake angle of 15° while the rip tooth of FIG. 3 is shown as having a typical rake angle of 4°. Referring to FIG. 8, the shear angle of the cross-cut tooth is shown as a typical 35°, and referring to FIG. 9 the shear angle of a typical rip tooth being 90°. It is to be understood that the rake angles and shear angles can vary as circumstances require and all without departing from the spirit of this invention.

Referring now to FIG. 1 of the drawings and the total apparatus, there is provided a surface plate clamp C that positionably grips the saw blade 10, and at least one guide block B that mounts a file F correctly rotated to cut a proper rake angle when reciprocably forced into engagement with the saw blade through manipulation. In practice, it is preferred that a pair of like guide blocks A and B be employed, one mounting each end of the file F and the at least one guide block B comprising file positioning means S rotatably orienting the file as is required in each case of saw sharpening. And in accordance with the invention, the said guide block B and/or guide blocks A and B are depressible, so as to enable optimum locating of the saw blade 10 and so as to enable forcible cutting engagement of the file F with said blade 10.

The surface plate clamp C is shown as providing an essential platform comprised of two coplanar plates 20 and 21 between which the blade 10 is clamped with its toothed margins projecting uniformly. A saw blade can be expected to be approximately six inches in depth, in which case the plates 20 and 21 are carried by complementary walls 22 and 23 of said depth (more or less), the bottom of wall 22 having a flange 24 parallel with plate 20 and turned to supportably underlie a bottom edge 25 of wall 23 parallel with plate 21. Thus, the plates are mounted in coplanar alignment, while the walls are adapted to forcibly clamp onto the saw blade, as by means of support within a bench vise (not shown). In the event that a miter saw is to be sharpened, its back need not be removed and spacers 26 are positioned at and between the plates 20 and 21 so as to maintain alignment of said plates (see FIG. 7).

Guide means in the form of 35° guidelines for crosscut saws and a 90° guideline for rip saws are incorporated in the surface of plates 20 and 21, there being aligned guide lines crossed at said angular increments in the two plates respectively, and along which the mounted file is manually reciprocated. Right and left crossed 35° guidelines are provided as shown, for sharpening oppositely set teeth. The appropriate line is selected for guiding and along which the file F is reciprocated on a working axis, thereby determining the shear angle to which the sharpened teeth are dressed.

In accordance with this invention I provide the at least one guide block B which mounts the sharpening file F and depressibly carries the file for adjustment of the saw blade and for controlled guided cutting action. Although various means can be provided for the depressible function, a unique feature of the present invention is that the guide blocks A and B are made of deformable material that has resilience so as to return to its original form, and to this end the blocks A and B are made of plastic, for example of nylon or the like having good frictional properties so as to be moved freely upon the smooth surfaces of the plates 20 and 21. Thus, each guide block A and B has a flat bottom 30 slideably engageable upon plates 20 and/or 21 as the case may be.

In accordance with this invention I provide the at least one guide block B with mounting means S to disengageably carry the file in parallel spaced relation to the coplanar surfaces of plates 20 and 21. A most practical form of means S is a tapered socket formed to the cross sectional configuration of the file F and into which the end portion of the file F is jammed. In practice, the files which are used for this purpose do not vary too greatly in cross sectional configuration, in which case the tapered socket readily accommodates the several files that are commonly used, and all of which is enhanced by the deformable yet resilient properties of the nylon or plastic guide block.

Referring now to the rotational orientation that is required of the file F, the socket S is triangular in form, a uni-lateral 60° triangle, in which one side X thereof is disposed at the required rake angle. For instance, the cross-cut socket (see FIG. 2) is rotated to dispose the left face at 15°, this side or face of the guide block B being marked "cross L"; and the cross-cut socket at the opposite side or face of the guide block B (see FIG. 6) being marked "cross R" and rotated to dispose the right face at 15°. Likewise, the rip cut socket (see FIG. 3) is rotated to dispose the left face at 4°, this side or face of the guide block B being marked "rip L"; and the rip cut socket at the opposite side or face of the guide block B (see FIG. 6) being marked "rip R" and rotated to dispose the right face at 4°. Thus, in the preferred form of the invention the guide block B is basically a rectangular solid which can be selectively revolved to the required mounting position and then gripped between the person's fingers for controlled and guided manipulation. For convenience and in order to provide a universal grip and facilitate manipulation, the top portion 31 of the block A and B is round and in the form of a knob.

Referring now to the guide block A, the tang of the file is to be supportably carried thereby, in which case a round tapered opening 32 is provided to frictionally mount the file F, inasmuch as the tang of such files is of random rather than a precise cross section. The plastic material of block A yields so as to receive and frictionally mount the said tang.

Having described the invention fully, it is a simple matter to tentatively clamp a saw blade 10 between the clamp walls 22 and 23 with the teeth thereof projecting upward from the planar surfaces of plates 20 and 21. The file F is then mounted into a pair of guide blocks A and B, selecting a socket S in guide block B which is to be sharpened. For example, a "cross L" for cross-cut teeth set to the side where the left face of the file is to dress and sharpen the same. The saw adjustment is then made by resting the mounted file over the saw teeth, by loosening the walls 22 and 23 of the surface plate clamp and permitting the file to fall into touching engagement within the roots of the teeth (at opposite ends of the surface plate clamp) while the bottoms 30 of the guide blocks A and B touch upon the plates 20 and 21; and then by tightening the surface plate clamps.

Having adjusted the saw blade 10 as hereinabove described, the file F is manipulated, by reciprocating the same through rectilinear motions, pressing downwardly and moving the file forwardly while relying upon the block mounting of the file for its rotational orientation, and by reciprocating the same rearwardly while releasing said downward pressure. The forward cutting motion is guided by observing the angularly disposed guide line in the surface of the plates 20 and 21 and which directs the proper axis of file movement. Consequently, the rake angle is governed by the selective mounting of the file into the guide block B while the shear angle is controlled by the manually guided direction of the file, enabling the person to execute a proper saw sharpening process, firstly sharpening teeth set to one side of the saw blade and secondly sharpening teeth set to the other side thereof.

Having described only a typical preferred form and application of my invention, I do not wish to be limited or restricted to the specific details herein set forth, but wish to reserve to myself any modifications or variations that may appear to those skilled in the art.

I claim:

1. In an apparatus for governing the rotative position of and for controlling the movement of a file in the sharpening of saw teeth; a platform from which the toothed marginal portion of the saw to be sharpened projects uniformly, and a guide block having a bottom slideably engageable upon the platform and having a depressible mounting means therein holding one end portion of the file rotatably oriented for forcible engagement with the saw teeth when sliding said guide block by manually depressing of and moving the file forwardly on its axis, and for disengagement from the saw teeth by manually releasing of and moving the file rearwardly on its axis.

2. The apparatus as set forth in claim 1, wherein the depressible mounting means comprises a pair of openings in the guide block and each with one side thereof flattened and disposed at the rake angle of the teeth to be sharpened, the said one side of one opening being disposed angularly to the left and the said one side of the other opening being disposed angularly to the right and so as to releasably mount the file to sharpen teeth set out at opposite sides of the saw blade respectively, and said openings being spaced from and on an axis parallel to the bottom of the guide block.

3. The apparatus as set forth in claim 1, wherein the guide block is made of deformable resilient material.

4. The apparatus as set forth in claim 1, wherein the platform is sectional and comprised of coplanar plates with depending walls opposed to embrace the saw blade therebetween.

5. The apparatus as set forth in claim 1, wherein the platform is sectional and comprised of coplanar plates and each with a depending wall, one of said walls having a shoulder projecting beneath and supporting the other wall locating the plates coplanar and opposed to embrace the saw blade therebetween.

6. The apparatus as set forth in claim 1, wherein the platform is sectional and comprised of coplanar plates with depending walls carrying spacers opposed to embrace the saw blade therebetween independent of an enlarged back of said saw blade.

7. A guide block for governing the rotative position of and for controlling the movement of a file in the sharpening of saw teeth, and comprising, a body of deformable resilient material having a bottom slideably engageable upon a guiding surface, and a mounting means in said body and holding one end portion of the file rotatably oriented for forcible engagement with the saw teeth when sliding said block by manually depressing of and moving the file forwardly on its axis, and for disengagement from the saw teeth by manually releasing of and moving the file rearwardly on its axis.

8. The guide block as set forth in claim 7, wherein the depressible mounting means comprises a pair of openings in the guide block and with one side thereof flattened and disposed at the rake angle of the teeth to be sharpened, the said one side of one opening being disposed angularly to the left and the said one side of the other opening being disposed angularly to the right and so as to releasably mount the file to sharpen teeth set out at opposite sides of the saw blade respectively, and said openings being spaced from and on an axis parallel to the bottom of the guide block.

9. A pair of guide blocks for governing the rotative position of and for controlling the movement of a file in the sharpening of saw teeth, one of said guide blocks comprising a body of deformable resilient material having a bottom slideably engageable upon a guiding surface, and a mounting means in said body and holding one end portion of the file rotatably oriented, and the other of said guide blocks comprising a body of deformable resilient material having a bottom slideably engageable upon a guiding surface coplanar with the first mentioned guiding surface, and a mounting means in said body and holding the other end portion of the file, the file being depressible into forcible engagement with the saw teeth by deforming the block when sliding said blocks and the said file forwardly and being disengageable from the saw teeth by releasing the blocks when moving the file rearwardly.

10. The pair of guide blocks as set forth in claim 9, wherein the depressible mounting means of the first mentioned one of said guide blocks comprises a pair of openings in the guide block and with one side thereof flattened and disposed at the rake angle of the teeth to be sharpened, the said one side of one opening being disposed angularly to the left and the said one side of the other opening being disposed angularly to the right and so as to releasably mount the file to sharpen teeth set out at opposite sides of the saw blade respectively, and said openings being spaced from and on an axis parallel to the bottom of the guide block, and wherein the depressible mounting means of the second mentioned other of said guide blocks comprises an opening therein, said openings in the two guide blocks being spaced from and on an axis parallel to the bottoms of the guide blocks.

* * * * *